US012764191B2

(12) United States Patent
Kato

(10) Patent No.: US 12,764,191 B2
(45) Date of Patent: Oct. 13, 2026

(54) VEHICLE COMMUNICATION MANAGEMENT SYSTEM

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 131 days.

(21) Appl. No.: 18/905,246

(22) Filed: Oct. 3, 2024

(65) Prior Publication Data

US 2025/0030767 A1 Jan. 23, 2025

Related U.S. Application Data

(63) Continuation of application No. PCT/JP2023/013215, filed on Mar. 30, 2023.

(51) Int. Cl.

| | |
|---|---|
| ***H04L 67/12*** | (2022.01) |
| ***G01C 21/34*** | (2006.01) |
| ***H04W 4/44*** | (2018.01) |

(52) U.S. Cl.

CPC .......... *H04L 67/12* (2013.01); *G01C 21/3407* (2013.01); *H04W 4/44* (2018.02)

(58) Field of Classification Search

CPC ....... H04L 67/12; H04W 4/44; G01C 21/3407

USPC .......................................................... 709/217

See application file for complete search history.

(56) References Cited

U.S. PATENT DOCUMENTS

| | | | | |
|---|---|---|---|---|
| 6,154,658 | A * | 11/2000 | Caci | H04M 11/04 455/66.1 |
| 10,640,108 | B2 * | 5/2020 | Katou | H04W 4/46 |
| 11,104,335 | B2 * | 8/2021 | Maeda | G08G 1/015 |

(Continued)

FOREIGN PATENT DOCUMENTS

| | | | | |
|---|---|---|---|---|
| CN | 109564728 | A * | 4/2019 | G08G 1/13 |
| JP | 2011-220802 | A | 11/2011 | |

(Continued)

OTHER PUBLICATIONS

International Search Report dated Jun. 20, 2023, from corresponding International Application No. PCT/JP2023/013215 (non-English).

*Primary Examiner* — Tauqir Hussain
(74) *Attorney, Agent, or Firm* — Rimon P.C.

(57) ABSTRACT

A vehicle communication management system includes a communicator, a vehicle position identifier, a storage, a first data amount calculator, and a second data amount calculator. The communicator communicates with the outside of a first vehicle to which the vehicle communication management system is to be applied. The first data amount calculator calculates an amount of download data necessary for the first vehicle. The second data amount calculator accumulates the amounts of the downloadable data until the first vehicle reaches a point where the communication state deteriorates. The communicator starts downloading the download data necessary for the first vehicle, at a point where a sum total of the amounts of the downloadable data accumulated by the second data amount calculator becomes larger than the amount of the download data calculated by the first data amount calculator as being necessary for the first vehicle.

4 Claims, 8 Drawing Sheets

(56) References Cited

U.S. PATENT DOCUMENTS

| | | | | |
|---|---|---|---|---|
| 11,743,698 | B2 * | 8/2023 | Sagane | H04W 4/46<br>370/310 |
| 2010/0240346 | A1 * | 9/2010 | Jain | H04W 4/024<br>455/414.1 |
| 2011/0166774 | A1 * | 7/2011 | Schunder | G01C 21/3469<br>701/533 |
| 2011/0167128 | A1 * | 7/2011 | Raghunathan | H04W 36/02<br>709/217 |
| 2014/0114482 | A1 * | 4/2014 | Slawinski | B25J 5/005<br>901/1 |
| 2017/0036771 | A1 * | 2/2017 | Woodman | B64C 25/10 |
| 2018/0101172 | A1 * | 4/2018 | Min | H04W 4/023 |
| 2018/0225970 | A1 * | 8/2018 | Mitra | G08G 1/09 |
| 2019/0079161 | A1 * | 3/2019 | Sogabe | G01S 5/14 |
| 2019/0116462 | A1 * | 4/2019 | Sagesaka | H04W 4/44 |
| 2019/0132719 | A1 * | 5/2019 | Mizutani | B60L 53/14 |
| 2019/0236957 | A1 * | 8/2019 | Hayakawa | G08G 1/0133 |
| 2020/0114941 | A1 * | 4/2020 | Nakamura | H04W 40/20 |
| 2020/0288374 | A1 * | 9/2020 | Henry | H04W 4/46 |
| 2021/0303001 | A1 * | 9/2021 | Xu | G08G 1/22 |
| 2021/0306827 | A1 * | 9/2021 | Sagane | H04W 4/46 |
| 2022/0397405 | A1 * | 12/2022 | Nagata | G01C 21/3461 |
| 2023/0274637 | A1 * | 8/2023 | Mizoguchi | G08G 1/012<br>701/119 |
| 2024/0321093 | A1 * | 9/2024 | Oyama | G08G 1/09 |

FOREIGN PATENT DOCUMENTS

| | | | | |
|---|---|---|---|---|
| JP | 2018-105724 | A | 7/2018 | |
| JP | 2022-190305 | A | 12/2022 | |
| WO | WO-2018021116 | A1 * | 2/2018 | G08G 1/01 |

* cited by examiner

| REGION | POINT | PRESENCE OR ABSENCE OF ELECTRIC WAVES | COMMUNICATION SPEED | NECESSARY TIME (S) | CUMULATIVE DOWNLOADABLE AMOUNT | NECESSARY AMOUNT OF DOWNLOAD DATA (500 MB) | NECESSARY AMOUNT OF DOWNLOAD DATA (1000 MB) |
|---|---|---|---|---|---|---|---|
| INCOMMUNICABLE REGION | | N | 0 | | | | |
| | | N | 0 | | | | |
| | | N | 0 | | | | |
| | | N | 0 | | | | |
| COMMUNICABLE REGION | P29 | Y | 5 | 199 | 3.75 | | |
| | P28 | Y | 5 | 193 | 7.5 | | |
| | P27 | Y | 10 | 187 | 15 | | |
| | P26 | Y | 15 | 181 | 26.25 | | |
| | P25 | Y | 15 | 175 | 37.5 | | |
| | P24 | Y | 20 | 169 | 52.5 | | |
| | P23 | Y | 25 | 163 | 71.25 | | |
| | P22 | Y | 40 | 157 | 101.25 | | |
| | P21 | Y | 60 | 150 | 155.25 | | |
| | P20 | Y | 80 | 141 | 245.25 | | |
| | P19 | Y | 80 | 132 | 335.25 | | |
| | P18 | Y | 90 | 120 | 537.75 | | |
| | P17 | Y | 80 | 102 | 717.75 | | |
| | P16 | Y | 70 | 96 | 770.25 | | |
| | P15 | Y | 50 | 90 | 807.75 | | |
| | P14 | Y | 30 | 84 | 830.25 | | |
| | P13 | Y | 10 | 78 | 837.75 | | |
| | P12 | Y | 50 | 72 | 875.25 | | |
| | P11 | Y | 60 | 66 | 920.25 | | |
| | P10 | Y | 60 | 60 | 965.25 | | |
| | P9 | Y | 40 | 54 | 995.25 | | |
| | P8 | Y | 30 | 48 | 1017.75 | | |
| | P7 | Y | 20 | 42 | 1032.75 | | |
| | P6 | Y | 15 | 36 | 1044 | | |
| | P5 | Y | 20 | 30 | 1059 | | |
| | P4 | Y | 40 | 24 | 1089 | | |
| | P3 | Y | 60 | 18 | 1134 | | |
| | P2 | Y | 60 | 12 | 1179 | | |
| | P1 | Y | 50 | 6 | 1216.5 | | |

CURRENT LOCATION

FIG. 3

| | POINT | PRESENCE OR ABSENCE OF ELECTRIC WAVES | COMMUNICATION SPEED | ESTIMATED VEHICLE SPEED | CUMULATIVE DOWNLOADABLE AMOUNT | NECESSARY AMOUNT OF DOWNLOAD DATA (500 MB) | NECESSARY AMOUNT OF DOWNLOAD DATA (1000 MB) |
|---|---|---|---|---|---|---|---|
| INCOMMUNICABLE REGION | | N | 0 | 60 | | | |
| | | N | 0 | 60 | | | |
| | | N | 0 | 60 | | | |
| | | N | 0 | 60 | | | |
| COMMUNICABLE REGION | P29 | Y | 5 | 60 | 3.75 | | |
| | P28 | Y | 5 | 60 | 7.5 | | |
| | P27 | Y | 10 | 60 | 15 | | |
| | P26 | Y | 15 | 60 | 26.25 | | |
| | P25 | Y | 15 | 60 | 37.5 | | |
| | P24 | Y | 20 | 60 | 52.5 | | |
| | P23 | Y | 25 | 60 | 71.25 | | |
| | P22 | Y | 40 | 50 | 101.25 | | |
| | P21 | Y | 60 | 40 | 155.25 | | |
| | P20 | Y | 80 | 40 | 245.25 | | |
| | P19 | Y | 80 | 20 | 335.25 | | |
| | P18 | Y | 90 | 20 | 537.75 | | |
| | P17 | Y | 80 | 60 | 717.75 | | |
| | P16 | Y | 70 | 60 | 770.25 | | |
| | P15 | Y | 50 | 60 | 807.75 | | |
| | P14 | Y | 30 | 60 | 830.25 | | |
| | P13 | Y | 10 | 60 | 837.75 | | |
| | P12 | Y | 50 | 60 | 875.25 | | |
| | P11 | Y | 60 | 60 | 920.25 | | |
| | P10 | Y | 60 | 60 | 965.25 | | |
| | P9 | Y | 40 | 60 | 995.25 | | |
| | P8 | Y | 30 | 60 | 1017.75 | | |
| | P7 | Y | 20 | 60 | 1032.75 | | |
| | P6 | Y | 15 | 60 | 1044 | | |
| | P5 | Y | 20 | 60 | 1059 | | |
| | P4 | Y | 40 | 60 | 1089 | | |
| | P3 | Y | 60 | 60 | 1134 | | |
| | P2 | Y | 60 | 60 | 1179 | | |
| | P1 | Y | 50 | 60 | 1216.5 | | |

CURRENT LOCATION

FIG. 7

VEHICLE COMMUNICATION MANAGEMENT SYSTEM

CROSS-REFERENCE TO RELATED APPLICATIONS

This application is continuation of International Application No. PCT/JP2023/013215, filed on Mar. 30, 2023, the entire contents of which are hereby incorporated by reference.

BACKGROUND

The disclosure relates to a vehicle communication management system.

In recent years, map data suitable for driver assistance or automated driving has been developed in line with advancement in a technique regarding the driver assistance or the automated driving.

To achieve the driver assistance or the automated driving, the map data to be used for the driver assistance or the automated driving has an enormous data volume, as compared with map data to be used simply for displaying a map on a device such as a navigation device.

With such an increase in the data volume, the map data for the driver assistance or the automated driving is typically saved on a storage such as a server, and a vehicle-side component downloads data including the map data for use from the server in response to a demand.

However, such a system may possibly involve difficulties in receiving the necessary map data at an appropriate location through communication with the server, for example, in a tunnel or in a wide area where an electric wave state is unsatisfactory. This can hinder the driver assistance or the automated driving from being constantly executed.

To address this concern, for example, Japanese Unexamined Patent Application Publication (JP-A) No. 2011-220802 discloses a navigation system including a navigation device that operates while communicating with an information center. The navigation device includes a current position detector, a travel direction detector, a determiner, a travel region estimator, and a data obtainer. The current position detector detects a current position of a vehicle on which the navigation device is mounted. The travel direction detector detects a travel direction of the vehicle. The determiner determines whether an incommunicable region where communication with the information center is difficult to be established, is present in the travel direction of the vehicle detected by the travel direction detector. When the determiner determines that the incommunicable region is present in the travel direction of the vehicle, the travel region estimator estimates a part of the incommunicable region where the vehicle is likely to travel. When the determiner determines that the incommunicable region is present in the travel direction of the vehicle, the data obtainer acquires data corresponding to the part of the incommunicable region estimated by the travel region estimator, from the information center before the current position of the vehicle detected by the current position detector enters the incommunicable region.

SUMMARY

An aspect of the disclosure provides a vehicle communication management system. The vehicle communication management system includes a communicator, a vehicle position identifier, a storage, a first data amount calculator, and a second data amount calculator. The communicator is configured to communicate with an outside of a first vehicle to which the vehicle communication management system is to be applied. The vehicle position identifier is configured to identify a current position of the first vehicle. The storage is configured to hold amounts of downloadable data that are linked with respective pieces of position data, based on communication states for the respective pieces of the position data. The first data amount calculator is configured to calculate an amount of download data necessary for the first vehicle. The second data amount calculator is configured to accumulate the amounts of the downloadable data until the first vehicle reaches a point where the communication state deteriorates, based on: route data on a route along which the first vehicle is likely to pass before reaching the point where the communication state deteriorates; the amounts of the downloadable data for the respective pieces of the position data held in the storage; and passing time periods for the respective pieces of the position data on the route along which the first vehicle is likely to pass before reaching the point where the communication state deteriorates. The communicator is configured to start downloading the download data necessary for the first vehicle, at a point where a sum total of the amounts of the downloadable data accumulated by the second data amount calculator becomes larger than the amount of the download data calculated by the first data amount calculator as being necessary for the first vehicle.

An aspect of the disclosure provides a vehicle communication management system. The vehicle communication management system includes a communicator, a vehicle position identifier, and a manager. The communicator is configured to communicate with an outside of a first vehicle to which the vehicle communication management system is to be applied. The vehicle position identifier is configured to identify a current position of the first vehicle. The manager is configured to manage the communicator. The manager includes one or more processors, and one or more memories communicably coupled to the one or more processors. The one or more memories include a storage configured to hold amounts of downloadable data that are linked with respective pieces of position data, based on communication states for the respective pieces of the position data. The one or more processors are configured to calculate an amount of download data necessary for the first vehicle. The one or more processors are configured to accumulate the amounts of the downloadable data until the first vehicle reaches a point where the communication state deteriorates, based on: route data on a route along which the first vehicle is likely to pass before reaching the point where the communication state deteriorates; the amounts of the downloadable data for the respective pieces of the position data held in the storage; and passing time periods for the respective pieces of the position data on the route along which the first vehicle is likely to pass before reaching the point where the communication state deteriorates. The one or more processors are configured to cause the communicator to start downloading the download data necessary for the first vehicle, at a point where a sum total of the accumulated amounts of the downloadable data becomes larger than the calculated amount of the download data necessary for the first vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 3 is a diagram illustrating a relationship among a communication speed, a necessary time period to travel between points, a cumulative downloadable amount, and a necessary amount of download data in a communicable region according to one example embodiment of the disclosure.

FIG. 7 is a diagram illustrating a relationship among a communication speed, an estimated vehicle speed, a cumulative downloadable amount, and a necessary amount of download data in a communicable region according to one example embodiment of the disclosure.

DETAILED DESCRIPTION

Figure 1:
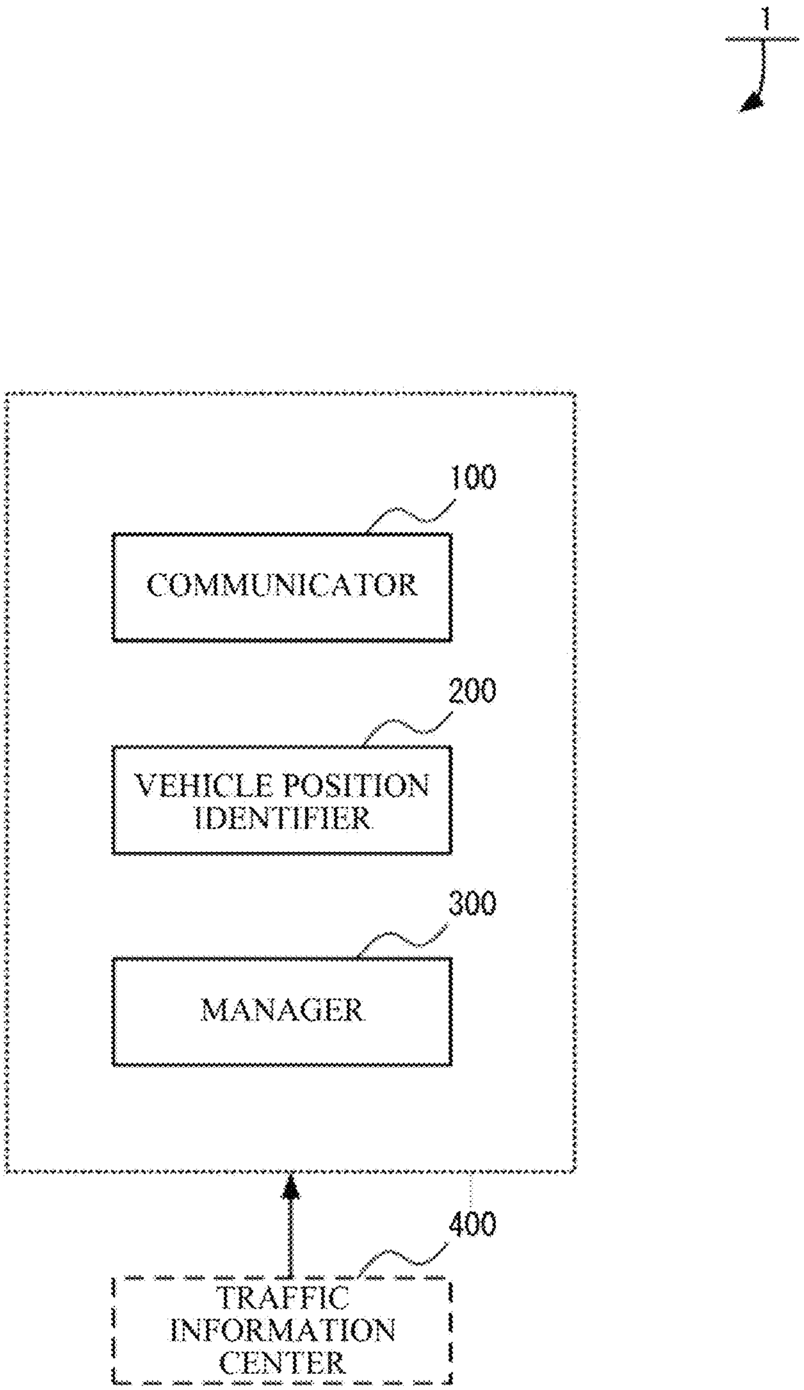
FIG. 1 is a diagram illustrating a configuration of a vehicle communication management system according to one example embodiment of the disclosure.

A technique disclosed in JP-A No. 2011-220802 is designed to stably provide a navigation service also in an incommunicable region where communication with an information center is difficult to be established.

The technique disclosed in JP-A No. 2011-220802, however, merely acquires, for example, data necessary to detect a current position of a vehicle from the information center before the current position of the vehicle detected by a current position detector enters the incommunicable region. The technique described in JP-A No. 2011-220802 has no mechanism that determines at which timing downloading is to be started to complete downloading the necessary data before the vehicle enters the incommunicable region. This also results in a case where the necessary data is not securable in the incommunicable region.

It is desirable to provide a vehicle communication management system that makes it possible to continue driver assistance or automated driving without hindrance even when a travel route includes an incommunicable region where communication with a server is difficult to be established.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

A vehicle communication management system according to some example embodiments will be described with reference to FIGS. 1 to 8.

First Example Embodiment

A vehicle communication management system 1 according to a first example embodiment will be described with reference to FIGS. 1 to 4.

Vehicle Communication Management System 1

Referring to FIG. 1, the vehicle communication management system 1 according to the first example embodiment includes a communicator 100, a vehicle position identifier 200, and a manager 300.

The communicator 100 communicates with the outside of an own vehicle to collect data. In one embodiment, the own vehicle may serve as a "first vehicle".

In the first example embodiment, the communicator 100 may communicate with a facility such as a traffic information center 400 to acquire data on a necessary time period to travel from a current position of the own vehicle to each of points on a route leading to a destination.

Further, the communicator 100 may download, for example, data necessary for control such as driver assistance control or automated driving control from an unillustrated storage such as a server, based on, for example, a control signal from the manager 300 to be described later.

Note that the communicator 100 may perform vehicle-to-everything (V2X) communication with any surrounding object.

The data acquired by the communicator 100 may be outputted to the manager 300 to be described later via, for example, a communication line.

The vehicle position identifier 200 identifies the current position of the own vehicle.

The vehicle position identifier 200 may include a receiver such as a global positioning system (GPS) receiver to detect the current position of the own vehicle, based on electric waves received from GPS satellites.

The data on the current position of the own vehicle identified by the vehicle position identifier 200 may be outputted to the manager 300 to be described later via, for example, a communication line.

The manager 300 may control an overall operation of the vehicle communication management system 1, based on a control program stored in a random-access memory (RAM) mounted in the manager 300.

In the first example embodiment, the manager 300 may control the communicator 100 to start downloading the data necessary for the own vehicle, for example, at a point where an amount of downloadable data accumulated in accordance with a necessary time period to travel to a point where a communication state deteriorates becomes larger than an amount of download data necessary in an incommunicable region.

Configuration of Manager 300

Figure 2:
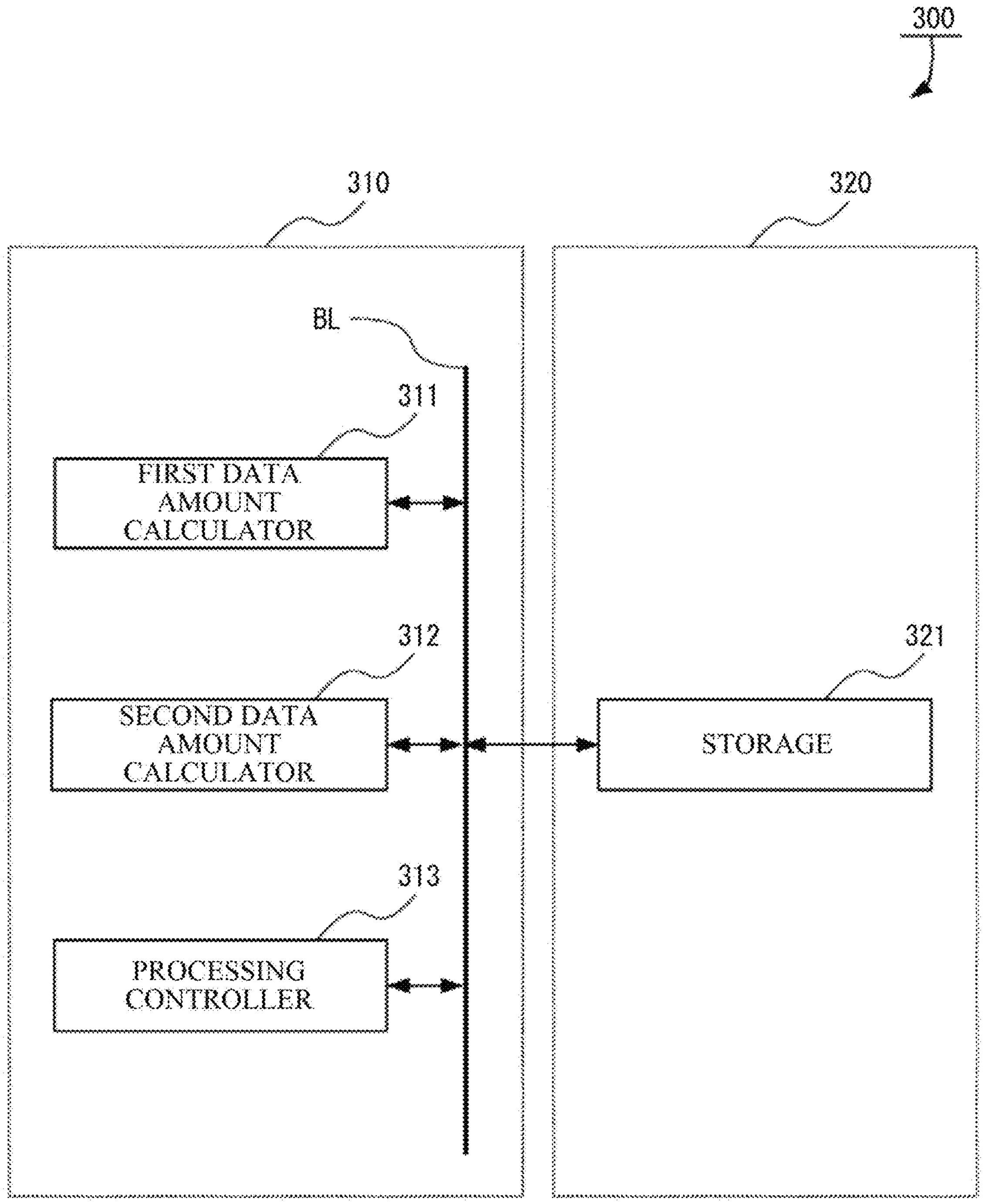
FIG. 2 is a diagram illustrating a configuration of a manager illustrated in FIG. 1.

Referring to FIG. 2, the manager 300 according to the first example embodiment includes a processor 310 and a memory 320.

As illustrated in FIG. 2, the processor 310 may include a first data amount calculator 311, a second data amount calculator 312, and a processing controller 313.

The memory 320 includes a storage 321.

In one embodiment, the first data amount calculator 311 may serve as a "first data amount calculator". In one embodiment, the second data amount calculator 312 may serve as a "second data amount calculator". In one embodiment, the memory 320 may serve as a "memory".

The first data amount calculator 311 calculates the amount of the download data necessary for the own vehicle.

For example, when the incommunicable region where the communication is interrupted is present ahead of the own vehicle on a travel route, the first data amount calculator 311 may calculate the amount of the download data necessary to execute the driver assistance control or the automated driving control of the own vehicle without interruption even in the incommunicable region.

In some embodiments, about where and at what distance, ahead of the own vehicle on the travel route, the incommunicable region where the communication is interrupted is present may be made available in advance by, for example, a communication company or a preceding vehicle having traveled along the travel route.

The first data amount calculator 311 may calculate the necessary amount of the download data, based on a time period of passing through the incommunicable region and an amount of the download data per unit time to be obtained by the communicator 100.

The necessary amount of the download data calculated by the first data amount calculator 311 may be outputted to the processing controller 313 via a bus line BL.

The second data amount calculator 312 accumulates the amounts of the downloadable data until the own vehicle reaches the point where the communication state deteriorates, based on: route data on a route along which the own vehicle is likely to pass before reaching the point where the communication state deteriorates; and the amounts of the downloadable data for respective pieces of position data held in the storage 321 to be described later.

In some embodiments, the second data amount calculator 312 may acquire the passing time periods for the respective pieces of the position data (point data) on the route along which the own vehicle is likely to pass before reaching the point where the communication state deteriorates, based on traffic data in a normal state on the route along which the own vehicle is likely to pass before reaching the point where the communication state deteriorates. The second data amount calculator 312 may store, in the storage 321 to be described later, the acquired passing time periods for the respective pieces of the position data.

The second data amount calculator 312 calculates the amounts of the downloadable data to be obtained until the own vehicle reaches the point where the communication state deteriorates, based on: the route data on the route along which the own vehicle is likely to pass before reaching the point where the communication state deteriorates; the amounts of the downloadable data for the respective pieces of the position data held in the storage 321; and the passing time periods for the respective pieces of the position data on the route along which the own vehicle is likely to pass before reaching the point where the communication state deteriorates.

The processing controller 313 may control an overall operation of the manager 300, based on the control program stored in the unillustrated random-access memory (RAM).

In the first example embodiment, the processing controller 313 controls the communicator 100 to start downloading the data necessary for the own vehicle, at the point where a sum total of the amounts of the downloadable data accumulated by the second data amount calculator 312 becomes larger than the necessary amount of the download data calculated by the first data amount calculator 311.

The storage 321 holds the amounts of the downloadable data that are linked with the respective pieces of the position data, based on the communication states for the respective pieces of the position data.

In the data held in the storage 321, for example, the route along which the own vehicle travels may be divided into a communicable region and the incommunicable region, as illustrated in FIG. 3.

The communicable region may be divided into multiple points, i.e., multiple pieces of the position data, in a unit of a predetermined distance.

Non-limiting examples of the data held in the storage 321 may include presence or absence of electric waves at each of the points, a communication speed at each of the points, a necessary time period to travel between the points, a cumulative downloadable amount to be obtained with the point where the communication state deteriorates being set as a starting point, and the necessary amount of the download data.

For example, the necessary time period may be a time period necessary for the own vehicle to travel along the route the most smoothly in the normal state. Such a necessary time period may be acquired from the traffic information center 400.

FIG. 3 illustrates an example of the above-described data on a part of the particular route. The storage 321 may hold the above-described data for each route.

The example in FIG. 3 illustrates the following example cases. When the necessary amount of the download data is 500 MB, the communicator 100 may start downloading the data at timing when the own vehicle reaches a point P18. When the necessary amount of the download data is 1000 MB, the communicator 100 may start downloading the data at timing when the own vehicle reaches a point P8.

Process in Vehicle Communication Management System 1

Figure 4:
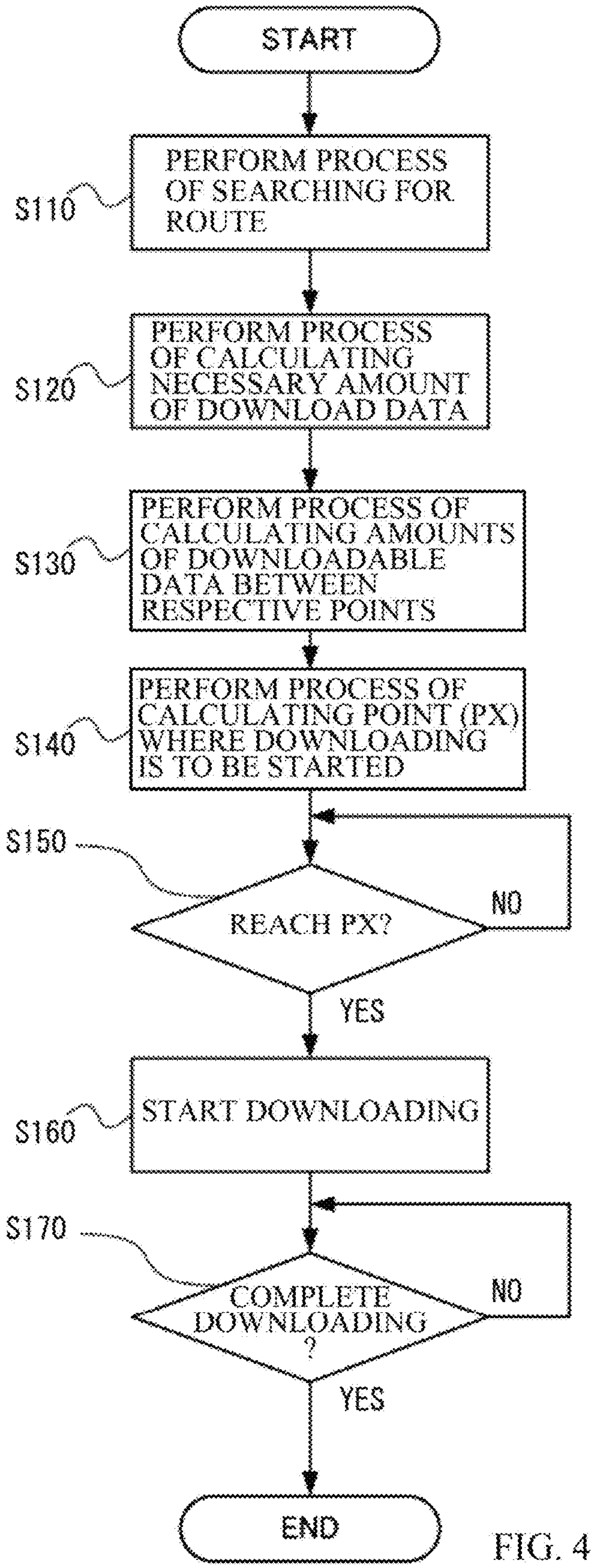
FIG. 4 is a flowchart of a process performed by the vehicle communication management system illustrated in FIG. 1.

A process performed by the vehicle communication management system 1 according to the first example embodiment will be described with reference to FIG. 4.

Based on the current position of the own vehicle identified by the vehicle position identifier 200 and the destination inputted by an occupant of the own vehicle, the processing controller 313 may cause an unillustrated route searcher to search for a route candidate, and may set the route selected by the occupant as the travel route (step S110).

The processing controller 313 may notify the travel route to the first data amount calculator 311 and the second data amount calculator 312.

Upon receiving the notification of the travel route from the processing controller 313, the first data amount calculator 311 may read the data on the notified travel route from the storage 321, and may calculate the amount of the download data necessary for the own vehicle (step S120).

The data on the amount of the download data calculated by the first data amount calculator 311 as being necessary for the own vehicle may be outputted to the processing controller 313 via the bus line BL.

Upon receiving the notification of the travel route from the processing controller 313, the second data amount calculator 312 may read the data on the notified travel route from the storage 321.

Thereafter, the second data amount calculator 312 may accumulate the amounts of the downloadable data until the own vehicle reaches the point where the communication state deteriorates, based on: the route data on the route along which the own vehicle is likely to pass before reaching the point where the communication state deteriorates; and the amounts of the downloadable data for the respective pieces of the position data held in the storage 321 (step S130).

A result of the calculation by the second data amount calculator 312 may be outputted to the processing controller 313 via the bus line BL.

The processing controller 313 may obtain a point PX where the sum total of the amounts of the downloadable data accumulated by the second data amount calculator 312 becomes larger than the necessary amount of the download data calculated by the first data amount calculator 311 (step S140).

Based on the data from the vehicle position identifier 200, the processing controller 313 may determine whether the own vehicle has reached the point PX (step S150).

If determining that the own vehicle has not reached the point PX (step S150: NO), the processing controller 313 may return the process and shift to a standby mode.

If determining that the own vehicle has reached the point PX (step S150: YES), the processing controller 313 may instruct the communicator 100 to start downloading the data (step S160).

Based on progress data from the communicator 100, the processing controller 313 may determine whether the communicator 100 has completed downloading the data (step S170).

If determining that the communicator 100 has not completed downloading the data (step S170: NO), the processing controller 313 may return the process and shift to the standby mode.

If the processing controller 313 determines that the communicator 100 has completed downloading the data (step S170: YES), the process may end.

Workings and Example Effects

As described above, the vehicle communication management system 1 according to the first example embodiment includes the communicator 100, the vehicle position identifier 200, and the manager 300. The communicator 100 communicates with the outside of the own vehicle. The vehicle position identifier 200 identifies the current position of the own vehicle. The manager 300 includes the storage 321, the first data amount calculator 311, and the second data amount calculator 312. The storage 321 holds the amounts of the downloadable data that are linked with the respective pieces of the position data, based on the communication states for the respective pieces of the position data. The first data amount calculator 311 calculates the amount of the download data necessary for the own vehicle. The second data amount calculator 312 accumulates the amounts of the downloadable data until the own vehicle reaches the point where the communication state deteriorates, based on: the route data on the route along which the own vehicle is likely to pass before reaching the point where the communication state deteriorates; and the amount of the downloadable data for the respective pieces of the position data held in the storage 321. When receiving the control signal from the processing controller 313 in the manager 300, the communicator 100 starts downloading the data necessary for the own vehicle, at the point where the sum total of the amounts of the downloadable data accumulated by the second data amount calculator 312 becomes larger than the necessary amount of the download data calculated by the first data amount calculator 311.

For example, when receiving the control signal from the processing controller 313 in the manager 300, the communicator 100 starts downloading the data necessary for the own vehicle, at the point where the sum total of the amounts of the downloadable data having been accumulated by the second data amount calculator 312 until the own vehicle reaches the point where the communication state deteriorates becomes larger than the necessary amount of the download data calculated by the first data amount calculator 311.

Such a configuration helps to continue the driver assistance or the automated driving without hindrance even when the travel route includes the incommunicable region where the communication with the server is difficult to be established.

The second data amount calculator 312 of the vehicle communication management system 1 according to the first example embodiment calculates the amounts of the downloadable data to be obtained until the own vehicle reaches the point where the communication state deteriorates, based on: the route data on the route along which the own vehicle is likely to pass before reaching the point where the communication state deteriorates; the amounts of the downloadable data for the respective pieces of the position data held in the storage 321; and the passing time periods for the respective pieces of the position data on the route along which the own vehicle is likely to pass before reaching the point where the communication state deteriorates.

For example, points A, B, and C serving as the position data may be on the route along which the own vehicle is likely to pass before reaching the point where the communication state deteriorates. In this case, the second data amount calculator 312 may calculate the amount of the downloadable data to be obtained during travel of the own vehicle from the current point A to the point C where the communication state deteriorates, based on the amount of the downloadable data per unit time at each of the points A, B, and C, and the necessary time period determined by a passing time period from the point A to the point B and a passing time period from the point B to the point C.

Such a configuration helps to hold in advance a sufficient amount of the download data necessary in the incommunicable region where the communication state deteriorates.

Therefore, the configuration helps to continue the driver assistance or the automated driving without hindrance even when the travel route includes the incommunicable region where the communication with the server is difficult to be established.

In some embodiments, the second data amount calculator 312 of the vehicle communication management system 1 may acquire the passing time periods for the respective pieces of the position data on the route along which the own vehicle is likely to pass before reaching the point where the communication state deteriorates, based on the traffic data in the normal state on the route along which the own vehicle is likely to pass before reaching the point where the communication state deteriorates.

For example, the second data amount calculator 312 may acquire the passing time periods for the respective pieces of the position data on the route along which the own vehicle is likely to pass before reaching the point where the communication state deteriorates, based on the traffic data in the normal state.

An actual passing time period may be delayed unexpectedly due to a factor such as an unanticipated incident, construction, or natural traffic congestion, but is typically not made earlier than the acquired passing time period. Such a configuration helps to hold in advance a sufficient amount of the download data necessary in the incommunicable region where the communication state deteriorates.

Therefore, the configuration helps to continue the driver assistance or the automated driving without hindrance even when the travel route includes the incommunicable region where the communication with the server is difficult to be established.

Second Example Embodiment

A vehicle communication management system 1A according to a second example embodiment will be described with reference to FIGS. 5 to 8.

Vehicle Communication Management System 1A

Figure 5:
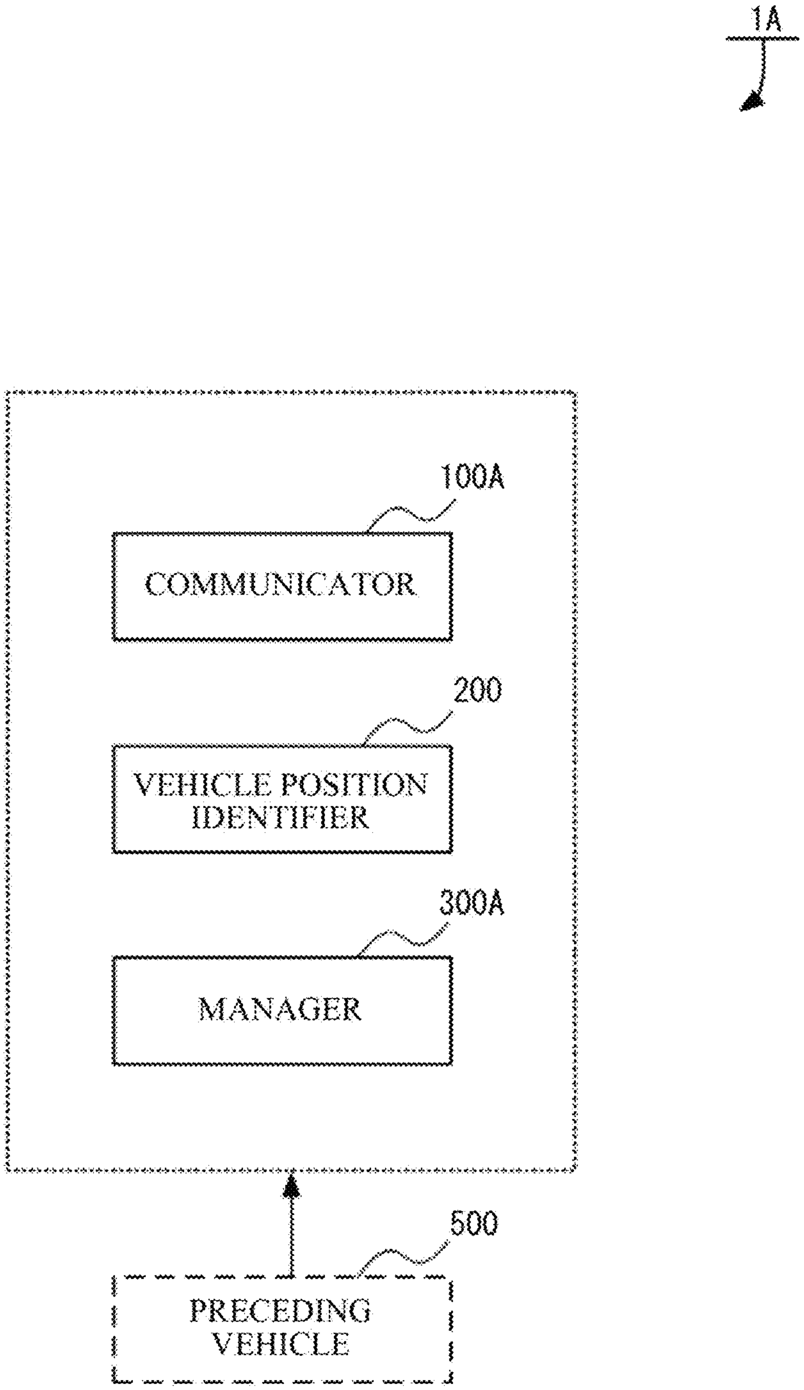
FIG. 5 is a diagram illustrating a configuration of a vehicle communication management system according to one example embodiment of the disclosure.

Referring to FIG. 5, the vehicle communication management system 1A according to the second example embodiment includes a communicator 100A, the vehicle position identifier 200, and a manager 300A.

Note that components denoted by the same reference numerals as those in the first example embodiment operate similarly to the respective components in the first example embodiment, and thus will not be described in detail.

The communicator 100A communicates with the outside of the own vehicle to collect data.

In the second example embodiment, the communicator 100A may communicate with, for example, a communication target including a preceding vehicle 500 on the route along which the own vehicle is likely to pass before reaching the point where the communication state deteriorates, and thereby acquire the data on the necessary time period to travel from the current position of the own vehicle to each of the points on the route leading to the destination. In one embodiment, the preceding vehicle 500 may serve as a "second vehicle".

The manager 300A may control an overall operation of the vehicle communication management system 1A, based on a control program stored in a random-access memory (RAM) mounted in the manager 300A.

In the second example embodiment, the manager 300A may calculate the passing time periods for the respective pieces of the position data on the route along which the own vehicle is likely to pass before reaching the point where the communication state deteriorates, based on, for example, the data received by the communicator 100A. The manager 300A may control the communicator 100A to start downloading the data necessary for the own vehicle, at the point where the sum total of the amounts of the downloadable data, having been accumulated in accordance with the necessary time period to travel to the point where the communication state deteriorates, becomes larger than the amount of the download data necessary in the incommunicable region.

Configuration of Manager 300A

Figure 6:
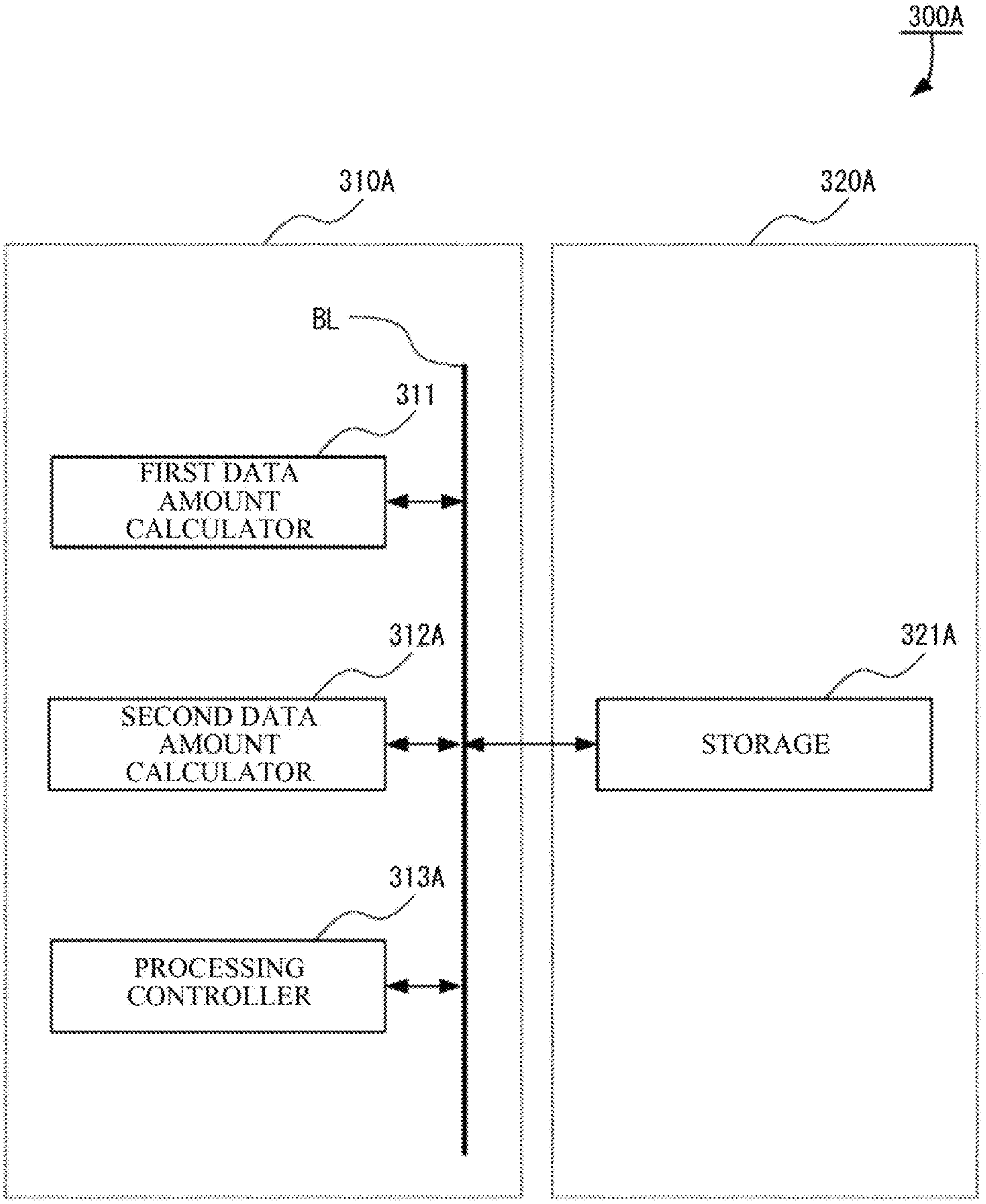
FIG. 6 is a diagram illustrating a configuration of a manager illustrated in FIG. 5.

In the second example embodiment, as illustrated in FIG. 6, a processor 310A of the manager 300A may include the first data amount calculator 311, a second data amount calculator 312A, and a processing controller 313A.

A memory 320A includes a storage 321A.

Note that components denoted by the same reference numerals as those in the first example embodiment operate similarly to the respective components in the first example embodiment, and thus will not be described in detail.

Based on the data received by the communicator 100A from the communication target including the preceding vehicle 500, the second data amount calculator 312A may calculate the passing time periods for the respective pieces of the position data on the route along which the own vehicle is likely to pass before reaching the point where the communication state deteriorates.

In some embodiments, the second data amount calculator 312A may acquire the passing time periods for the respective pieces of the position data (the point data) on the route along which the own vehicle is likely to pass before reaching the point where the communication state deteriorates, based on the data from the communication target including the preceding vehicle 500. The second data amount calculator 312A may store, in the storage 321A to be described later, the acquired passing time periods for the respective pieces of the position data.

The second data amount calculator 312A calculates the amounts of the downloadable data to be obtained until the own vehicle reaches the point where the communication state deteriorates, based on: the route data on the route along which the own vehicle is likely to pass before reaching the point where the communication state deteriorates; the amounts of the downloadable data for the respective pieces of the position data held in the storage 321A; and the passing time periods for the respective pieces of the position data on the route along which the own vehicle is likely to pass before reaching the point where the communication state deteriorates.

In the second example embodiment, the processing controller 313A may control the communicator 100A to start downloading the data necessary for the own vehicle, at the point where the sum total of the amounts of the downloadable data accumulated by the second data amount calculator 312A becomes larger than the necessary amount of the download data calculated by the first data amount calculator 311.

The storage 321A holds the amounts of the downloadable data that are linked with the respective pieces of the position data, based on the communication states for the respective pieces of the position data.

In the data held in the storage 321A, for example, the route along which the own vehicle travels may be divided into the communicable region and the incommunicable region, as illustrated in FIG. 7.

The communicable region may be divided into the multiple points, i.e., the multiple pieces of the position data, in a unit of a predetermined distance.

Non-limiting examples of the data held in the storage 321A may include the presence or absence of the electric waves at each of the points, the communication speed at each of the points, an estimated vehicle speed at each of the points, the cumulative downloadable amount to be obtained with the point where the communication state deteriorates being set as a starting point, and the necessary amount of the download data.

For example, the estimated vehicle speed may be the latest data on a vehicle speed acquired from an object such as the preceding vehicle 500.

FIG. 7 illustrates an example of the above-described data on a part of the particular route. The storage 321A may hold the above-described data for each route.

The example in FIG. 7 illustrates the following example cases. When the necessary amount of the download data is 500 MB, the communicator 100A may start downloading the data at the timing when the own vehicle reaches the point P18. When the necessary amount of the download data is 1000 MB, the communicator 100A may start downloading the data at the timing when the own vehicle reaches the point P8.

Process in Vehicle Communication Management System 1A

Figure 8:
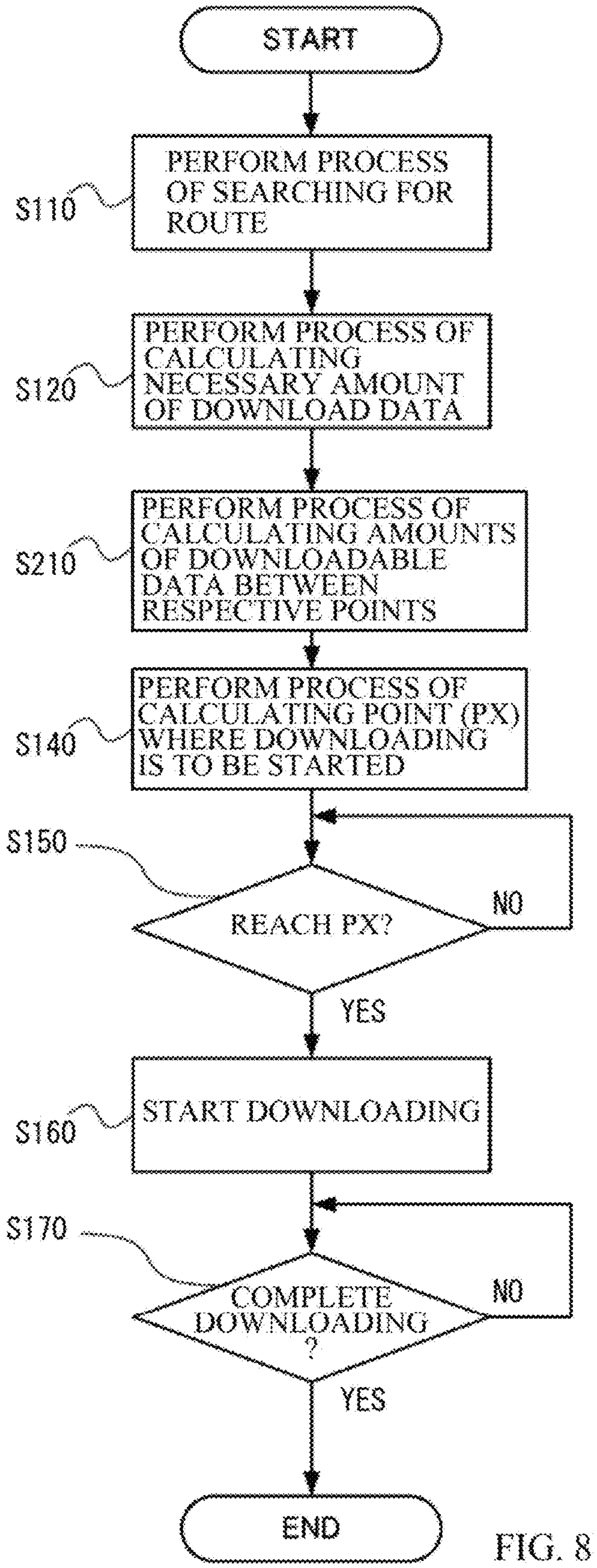
FIG. 8 is a flowchart of a process performed by the vehicle communication management system illustrated in FIG. 5.

A process performed by the vehicle communication management system 1A according to the second example embodiment will be described with reference to FIG. 8.

Based on the current position of the own vehicle identified by the vehicle position identifier 200 and the destination inputted by the occupant, the processing controller 313A may cause the unillustrated route searcher to search for a route candidate, and may set the route selected by the occupant as the travel route (step S110).

The processing controller 313A may notify the travel route to the first data amount calculator 311 and the second data amount calculator 312A.

Upon receiving the notification of the travel route from the processing controller 313A, the first data amount calculator 311 may read the data on the notified travel route from the storage 321A, and may calculate the amount of the download data necessary for the own vehicle (step S120).

The data on the amount of the download data calculated by the first data amount calculator 311 as being necessary for the own vehicle may be outputted to the processing controller 313A via the bus line BL.

Upon receiving the notification of the travel route from the processing controller 313A, the second data amount calculator 312A may read the data on the notified travel route from the storage 321A.

Thereafter, the second data amount calculator 312A may calculate the passing time periods for the respective pieces of the position data on the route along which the own vehicle is likely to pass before reaching the point where the communication state deteriorates, based on the data received by the communicator 100A from the preceding vehicle 500. The second data amount calculator 312A may update the data in the storage 321A.

Thereafter, the second data amount calculator 312A may calculate the amounts of the downloadable data to be obtained until the own vehicle reaches the point where the communication state deteriorates by accumulating the amounts of the downloadable data between the respective pieces of the position data, based on: the route data on the route along which the own vehicle is likely to pass before reaching the point where the communication state deteriorates; the amounts of the downloadable data for the respective pieces of the position data held in the storage 321A; and the passing time periods for the respective pieces of the position data on the route along which the own vehicle is likely to pass before reaching the point where the communication state deteriorates (step S210).

A result of the calculation by the second data amount calculator 312A may be outputted to the processing controller 313A via the bus line BL.

The processing controller 313A may obtain the point PX where the sum total of the amounts of the downloadable data accumulated by the second data amount calculator 312A becomes larger than the necessary amount of the download data calculated by the first data amount calculator 311 (step S140).

Based on the data from the vehicle position identifier 200, the processing controller 313A may determine whether the own vehicle has reached the point PX (step S150).

If determining that the own vehicle has not reached the point PX (step S150: NO), the processing controller 313A may return the process and shift to the standby mode.

If determining that the own vehicle has reached the point PX (step S150: YES), the processing controller 313A may instruct the communicator 100A to start downloading the data (step S160).

Based on progress data from the communicator 100A, the processing controller 313A may determine whether the communicator 100A has completed downloading the data (step S170).

If determining that the communicator 100A has not completed downloading the data (step S170: NO), the processing controller 313A may return the process and shift to the standby mode.

If the processing controller 313A determines that the communicator 100A has completed downloading the data (step S170: YES), the process may end.

Workings and Example Effects

As described above, the communicator 100A of the vehicle communication management system 1A according to the second example embodiment may communicate with the communication target including the preceding vehicle on the route along which the own vehicle is likely to pass before reaching the point where the communication state deteriorates. The second data amount calculator 312A may calculate the passing time periods for the respective pieces of the position data on the route along which the own vehicle is likely to pass before reaching the point where the communication state deteriorates, based on the data received by the communicator 100A.

For example, based on the data received by the communicator 100A from the communication target including the preceding vehicle on the route along which the own vehicle is likely to pass before reaching the point where the communication state deteriorates, the second data amount calculator 312A may calculate the passing time periods for the respective pieces of the position data on the route along which the own vehicle is likely to pass before reaching the point where the communication state deteriorates.

Such a configuration helps to control, based on real-time data, timing when the communicator 100A starts downloading the data.

Therefore, the configuration helps to continue the driver assistance or the automated driving without hindrance even when the travel route includes the incommunicable region where the communication with the server is difficult to be established.

Modification Example 1

In the foregoing example embodiments, the managers 300 and 300A perform a process of calculating the amount of the download data necessary for the own vehicle, perform a process of calculating the amounts of the downloadable data to be obtained until the own vehicle reaches the point where the communication state deteriorates, and manage timing when the communicators 100 and 100A start downloading the data; however, this is a non-limiting example. In some embodiments, the system may include a server in place of the managers 300 and 300A.

Such a system including the server helps to expand a range of a target preceding vehicle and more promptly manage the timing when the communicators 100 and 100A start downloading the data.

Modification Example 2

Although not clearly described in the foregoing example embodiments, the communication speed can differ depending on an application program to be used to download the data.

In some embodiments, when the communication speed differs depending on the application program, the communicable region and the incommunicable region may be set for each application program to be used, and the timing may be calculated when the communicators 100 and 100A start downloading the data. Such data may be held in the storages 321 and 321A.

Note that it is possible to implement the vehicle communication management systems 1 and 1A of the example embodiments of the disclosure by recording the process to be executed by the managers 300 and 300A on a non-transitory recording medium readable by a computer system, and causing the computer system to load the program recorded on the non-transitory recording medium onto the managers 300 and 300A to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in detail with reference to the accompanying drawings, the configuration is not particularly limited to these example embodiments, and may include designs and the like within a range not departing from the gist of the disclosure.

The first data amount calculator 311 illustrated in FIGS. 2 and 6, the second data amount calculator 312 illustrated in FIG. 2, and the second data amount calculator 312A illustrated in FIG. 6 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the first data amount calculator 311, the second data amount calculator 312, and the second data amount calculator 312A. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the first data amount calculator 311 illustrated in FIGS. 2 and 6, the second data amount calculator 312 illustrated in FIG. 2, and the second data amount calculator 312A illustrated in FIG. 6.

The invention claimed is:

1. A vehicle communication management system comprising:

a communicator configured to communicate with an outside of a first vehicle to which the vehicle communication management system is configured to be applied;

a vehicle position identifier configured to identify a current position of the first vehicle;

a storage configured to hold data for respective positions on a route along which the first vehicle is likely to pass before reaching a point where a communication state deteriorates, the data including communication speeds for the respective positions, passing time periods between the respective positions, and amounts of downloadable data linked with the respective positions, each communication speed being based on a communication state at a corresponding one of the positions, and the amounts of downloadable data being based on the communication speeds and the passing time periods;

a first data amount calculator configured to calculate an amount of download data necessary for the first vehicle to continue driver assistance control or automated driving control in a region where communication is interrupted;

a second data amount calculator configured to calculate, for each of the respective positions, a cumulative downloadable amount by accumulating, in order from the point where the communication state deteriorates toward the current position of the first vehicle along the route, the amounts of downloadable data linked with positions between the respective position and the point where the communication state deteriorates, based on: (i) route data on the route; (ii) the amounts of downloadable data for the respective positions held in the storage; and (iii) passing time periods between the respective positions on the route; and a processing controller configured to:

obtain a download start position, the download start position being one of the respective positions at which the cumulative downloadable amount becomes larger than the amount of the download data calculated by the first data amount calculator as being necessary for the first vehicle;

determine, based on the current position identified by the vehicle position identifier, whether the first vehicle has reached the download start position; and instruct the communicator to start downloading the download data necessary for the first vehicle when the first vehicle has reached the download start position.

2. The vehicle communication management system according to claim 1, wherein the second data amount calculator is configured to acquire, based on traffic data in a normal state on the route, the passing time periods between the respective positions on the route.

3. The vehicle communication management system according to claim 1, wherein the communicator is configured to communicate with a communication target on the route, the communication target comprising a second vehicle preceding the first vehicle on the route, and the second data amount calculator is configured to calculate the passing time periods between the respective positions on the route, based on data received by the communicator from the communication target.

4. A vehicle communication management system comprising:

a communicator configured to communicate with an outside of a first vehicle to which the vehicle communication management system is configured to be applied;

a vehicle position identifier configured to identify a current position of the first vehicle; and a manager configured to manage the communicator, wherein the manager comprises one or more processors, and one or more memories communicably coupled to the one or more processors, the one or more memories comprising a storage, the storage being configured to hold data for respective positions on a route along which the first vehicle is likely to pass before reaching a point where a communication state deteriorates, the data including communication speeds for the respective positions, passing time periods between the respective positions, and amounts of downloadable data linked with the respective positions, each communication speed being based on a communication state at a corresponding one of the positions, and the amounts of downloadable data being based on the communication speeds and the passing time periods, the one or more processors being configured to calculate an amount of download data necessary for the first vehicle to continue driver assistance control or automated driving control in a region where communication is interrupted, calculate, for each of the respective positions, a cumulative downloadable amount by accumulating, in order from the point where the communication state deteriorates toward the current position of the first vehicle along the route, the amounts of downloadable data linked with positions between the respective position and the point where the communication state deteriorates until, based on: (i) route data on the route; (ii) the amounts of downloadable data for the respective positions held in the storage; and (iii) passing time periods between the respective positions on the route; and obtain a download start position, the download start position being one of the respective positions at which the cumulative downloadable amount becomes larger than the amount of the download data calculated by the one or more processors as being necessary for the first vehicle;

determine, based on the current position identified by the vehicle position identifier, whether the first vehicle has reached the download start position; and instruct the communicator to start downloading the download data necessary for the first vehicle when the first vehicle has reached the download start position.

* * * * *